J. KENNEDY.
GEAR DRIVE FOR THREE-HIGH ROLLING MILLS.
APPLICATION FILED DEC. 31, 1912.
1,112,218.
Patented Sept. 29, 1914.
2 SHEETS—SHEET 1.
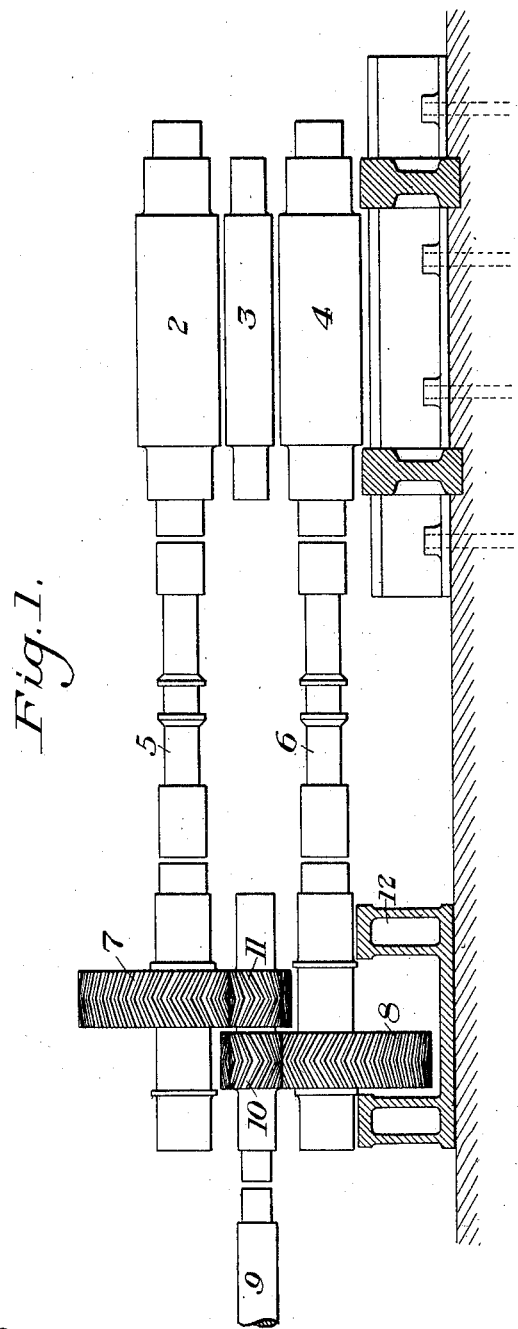
WITNESSES
INVENTOR J. KENNEDY.
GEAR DRIVE FOR THREE-HIGH ROLLING MILLS.
APPLICATION FILED DEC. 31, 1912.
1,112,218.
Patented Sept. 29, 1914.
2 SHEETS—SHEET 2.
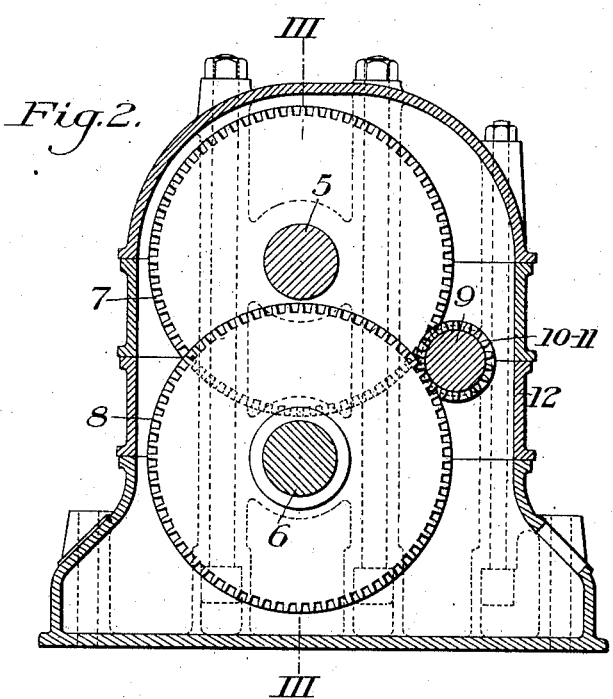
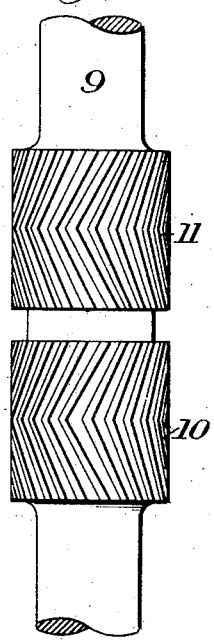
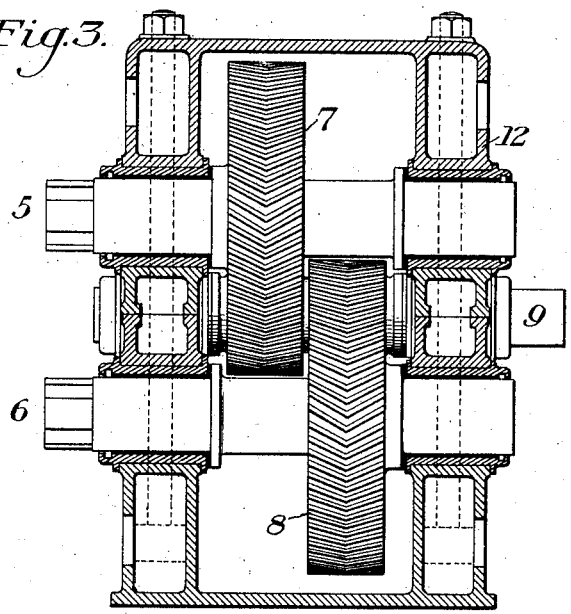
WITNESSES
INVENTOR

UNITED STATES PATENT OFFICE.

JULIAN KENNEDY, OF PITTSBURGH, PENNSYLVANIA.

GEAR-DRIVE FOR THREE-HIGH ROLLING-MILLS.

1,112,218.  Specification of Letters Patent.  Patented Sept. 29, 1914.

Application filed December 31, 1912. Serial No. 739,559.

*To all whom it may concern:*

Be it known that I, JULIAN KENNEDY, a citizen of the United States, and resident of Pittsburgh, in the county of Allegheny and State of Pennsylvania, have invented a new and useful Improvement in Gear-Drives for Three-High Rolling-Mills, of which the following is a full, clear, and exact description, reference being had to the accompanying drawings, forming part of this specification, in which—

Figure 1 is a view, largely conventional, and showing a portion of a rolling mill partly in elevation, and partly in vertical section; Fig. 2 is a vertical section through the driving gear and the housing therefor; Fig. 3 is a vertical section on the line III—III of Fig. 2; and Fig. 4 is a detail view of a portion of the driving shaft.

My invention has relation to gear drives for three-high rolling mills; and is designed to provide a drive in which the driving gears for the mill rolls may be of larger diameters than has been possible heretofore.

Referring to the accompanying drawings, the numeral 2 designates the top roll of a three-high mill, 3 the intermediate roll, and 4 the lower roll.

5 and 6 designate the usual driving connections and couplings for the rolls 2 and 4.

7 and 8 designate two gear wheels for driving the rolls 2 and 4 respectively. These gear wheels are made of relatively large diameters, and are placed in different vertical planes so that their peripheral portions may overlap.

9 designates the driving shaft carrying the two pinions 10 and 11, which mesh respectively with the gear wheels 7 and 8. This shaft or spindle is journaled to one side of the vertical centers of the gear wheels 7 and 8, as shown in Fig. 2.

12 designates a suitable housing for the gears, and in which their spindles are journaled.

The gears 7 and 8, together with the pinions 10 and 11, are preferably, although not necessarily, provided with double-helical teeth.

The advantages of my invention will be apparent to those skilled in the art, since it provides a very simple gear drive for three-high mills, in which driving gears of maximum diameter may be employed, owing to their overlapping arrangement. The driving motor can be directly coupled or connected to the shaft 9; and owing to the large diameters of the gears 7 and 8 the pinions 10 and 11 exert a very powerful driving action upon the rolls.

What I claim is:—

1. A gear drive for three-high rolling mills, comprising a gear housing, overlapping staggered toothed wheels mounted within said housing in close relation to each other, driving connections between said wheels and the mill rolls, and a driving shaft having pinion gears meshing with the toothed wheels within the gear housing, substantially as described.

2. The combination with a three-high rolling mill, of a drive therefor, said drive comprising a supplemental housing separated from the mill housing, two horizontal shafts journaled in the supplemental housing one above the other and connected respectively to the top and bottom rolls of the mill, a gear wheel secured to each of said shafts, the two wheels being in closely adjacent overlapping relation to each other, and a driving shaft also journaled in said supplemental housing and having a pinion which meshes with each of said gear wheels; substantially as described.

3. The combination with a three-high rolling mill, of a drive therefor, said drive comprising a supplemental housing separated from the mill housing, two horizontal shafts journaled in the supplemental housing one above the other and connected respectively to the top and bottom rolls of the mill, a gear wheel secured to each of said shafts within the supplemental housing, the two wheels being in closely adjacent overlapping relation to each other, and a driving shaft or spindle also journaled in said supplemental housing and having a pinion which meshes with each of said gear wheels, said gear wheels being separated laterally from each other a distance less than the width of the housing for the mill rolls; substantially as described.

In testimony whereof, I have hereunto set my hand.

JULIAN KENNEDY.

Witnesses:
R. A. BALDERSON,
GEO. H. PARMELEE.

Copies of this patent may be obtained for five cents each, by addressing the "Commissioner of Patents, Washington, D. C."